Oct. 28, 1930.   J. E. HASTINGS   1,779,812
FEELER GAUGE
Filed April 6, 1928
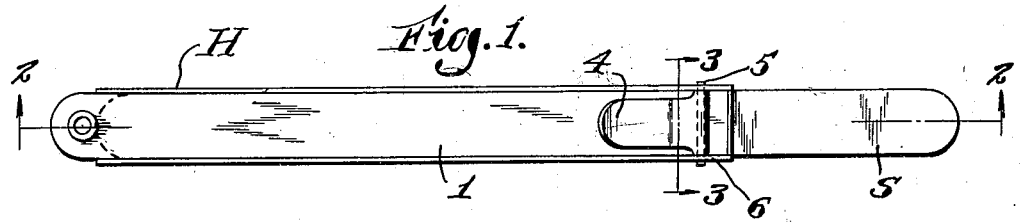
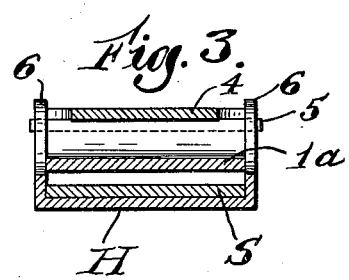
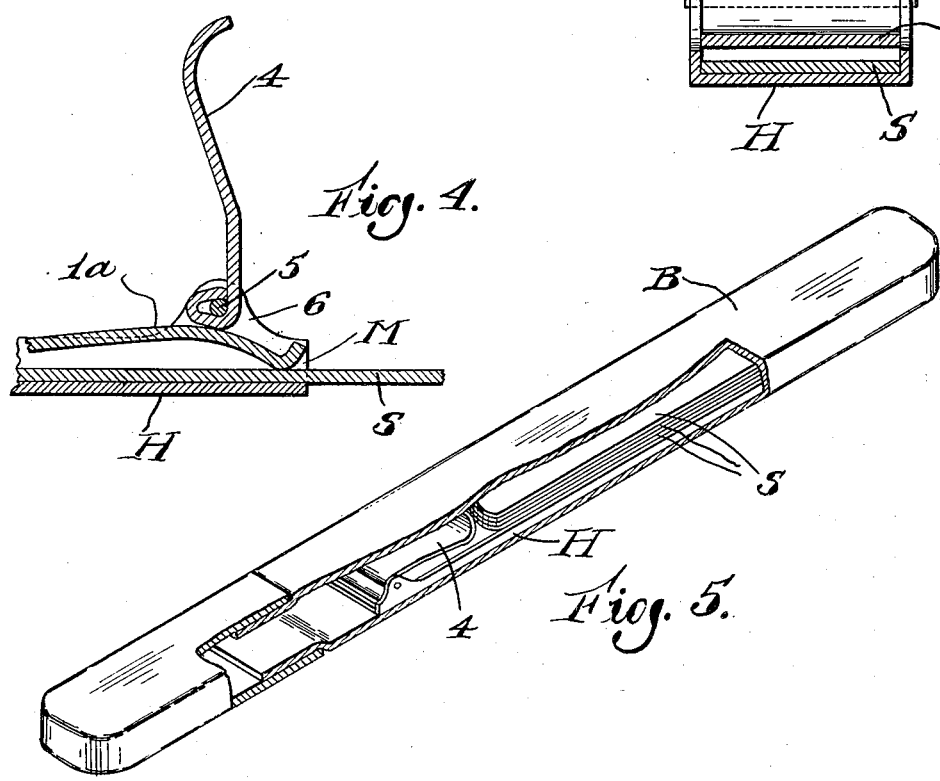
Inventor
James E. Hastings
by [signature]
Attorney Patented Oct. 28, 1930

1,779,812

UNITED STATES PATENT OFFICE

JAMES E. HASTINGS, OF ATHOL, MASSACHUSETTS

FEELER GAUGE

Application filed April 6, 1928. Serial No. 268,036.

This invention relates to thickness or feeler gauge holders. It deals more particularly with a holder which is capable of handling a single strip of feeler gauge stock at a time but is adapted to receive such strips of any thicknesses for which there is likely to be demand under the usual conditions where such feeler gauges are used. Such stock usually runs from .0015 up to .025 of an inch which is a wide range when the minuteness of variation is considered and the required delicacy of the clamping pressure borne in mind.

Such a holder as I disclose in the present invention is of particular value to an automobile mechanic who is called upon to work on different kinds of cars, many of which require different thicknesses of feeler gauge for clearance adjustment. It has been common practice for automobile manufacturers, service stations or machine shops to buy stock strips of length of the particular gauge stocks needed in the work and cut short lengths for issue to the mechanic. Such strips are very difficult to hold and sometimes seriously cut the mechanic's hands. Furthermore, such stock is liable to be bent or mutilated. To overcome these difficulties, I have devised my present invention.

Another difficulty with earlier holders has been that the holder was not capable of receiving strips of stock of more than one standard thickness. This meant that, if a mechanic in his work had need for more than one size feeler gauge, it was necessary for him to possess a handle which would receive that thickness of stock. This was expensive, inconvenient and liable to cause confusion. By my present invention, but a single handle is necessary, and the varying sizes of stock may be readily inserted or removed from this handle as it is desired to use one or the other. The strips of stock themselves are so thin that a full supply of all necessary sizes can very easily be carried in a small case which also receives the handle and one form of which I have illustrated in the drawing.

Throughout the specification and drawings like reference characters are used to designate corresponding parts.

In the drawings:—

Fig. 1 is a top plan view of a holder for thickness gauge stock in accordance with my invention and illustrating in dotted lines the projection of the thickness gauge stock from the holder, as desired.

Fig. 2 is a longitudinal section through the device shown in Fig. 1.

Fig. 3 is a cross section on the line 3—3 of Fig. 1.

Fig. 4 is an enlarged sectional view through the receiving end of the device, and Fig. 5 is a view showing a proper sized container within which my holder and a plurality of strips of different sizes of thickness gauge stock may be packed for convenience of assembly and use.

My holder consists of a generally rectangular-shaped case closed at one end and open at its opposite end and presenting spaced top and bottom walls and connecting side walls. This holder may be made of any desired material and in the illustrated form shown in the drawings the top wall thereof is preferably made as a deformable tongue which acts as the clamping member. This deformable top wall is adapted to be pressed down upon the inserted strip of feeler gauge stock so as releasably to hold said stock in any position of adjustment therein. This top wall is provided near its open end and under the operating cam with a bend or wave whereby accommodation is provided for the varying thicknesses of stock which may be inserted in the holder between the top and bottom walls.

I have indicated at H the holder generally and at S the stock. The deformable top wall above referred to is indicated by the numeral 1, the bend being identified by the numeral 1ª.

The releasable stock clamping means consists of a cam lever 4 which is pivoted at 5 in ears 6 extending upwardly from the opposite side walls of the case. The cam lever is designed to occupy a position over the bend or hump 1ª in the deformable top wall 1 of the case, and its free end is preferably turned upwardly sufficient to permit the mechanic to engage it with his thumb nail and raise the lever. In the form shown the raising of the lever from engagement with the top wall of the case releases the grip of the top wall on the feeler stock, permitting the stock to be pushed into or projected out of the case, after which the lever is pressed down again to cause the stock to be clamped and held in the desired position.

Regardless of the thickness of the stock inserted, when the cam lever is swung down upon the hump it deforms the top wall 1 to an extent to hold the stock clamped tightly within the holder. The hump 1ª allows for a sufficient yield in the clamp to accommodate strips of different thicknesses, the action of the cam on the upper wall tending to clamp the same firmly. It will be understood that the top wall is the clamp member and the cam lever is the positive element by means of which the clamp is deformed under pressure from its normal position whereby resiliently to hold the inserted strip of stock.

In use a strip of stock S is inserted in the holder H through the mouth M and is pushed back until it engages the rear end of the holder. If such strips are cut, for example, into six inch lengths, the piece in use extends beyond the mouth of my holder a sufficient distance to permit use thereof under ordinary requirements. Under certain circumstances it is necessary to use a greater length of stock. Much more satisfactory results are secured by using a six or eight inch piece of feeler gauge stock with my holder than by using a twelve or fourteen inch strip without a holder as the stock is susceptible to bending away from position.

With my holder the user can adjust the amount of stock protruding to fit the circumstances and when one particular spot of the gauge is worn away it can be snipped off and the strip held in the holder advanced until a suitable amount extends from the mouth. This operation may be repeated until all the stock has been used up, and because of the function of the holder as a handle as well as a case the stock may be used down to practically the last half inch.

In Fig. 5 is shown a pocket case or box B in which the holder and a set of strips of stock of different thicknesses may be packed. This pack may be carried in a pocket and permits any size desired to be readily procurable whereas it would be practically impossible to carry a sufficient number of holders each equipped with suitable stock to take care of all possible emergencies.

Various modifications in the form and construction of my device may obviously be resorted to without departing from the spirit and scope of my invention if within the limits of the appended claims.

What I therefore claim and desire to secure by Letters Patent is:—

1. An adjustable holder for strips of feeler gauge stock of different thicknesses, comprising a combination handle member and protective casing within which a strip of sharp-edged feeler gauge stock is adapted to be endwise inserted a substantial distance with its sharp edges protected by the casing and with one end exposed beyond the adjacent end of the casing for use as a flexible feeler gauge portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, said casing including a clamping wall having a resilient arched terminal lip deformable under pressure resiliently to engage and hold the stock within said casing, and a positive clamp on said casing for deforming said lip into variable clamping engagement with the strip of stock to hold the adjustment thereof.

2. An adjustable holder for strips of feeler gauge stock of different thicknesses within which a strip of sharp-edged feeler gauge stock is adapted to be endwise inserted a substantial distance with its sharp edges protected by the casing and with one end exposed beyond the adjacent end of the casing for use as a flexible feeler gauge portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, said casing comprising a clamping wall having a resilient arched terminal lip deformable under pressure resiliently to engage and hold the stock within said casing, and a positive cam on said casing opposite said arched lip for deforming said lip into variable clamping engagement with the strip of stock to hold the adjustment thereof.

3. In a feeler gauge, the combination with a handle member and hand protective casing, of a strip of feeler gauge stock disposed within said casing and adapted to be withdrawn progressively therefrom and cut off at its exposed end when mutilated, said casing comprising a walled enclosure including spaced top and bottom walls defining a strip receiving chamber closed at one end and open at its opposite end and within which the strip of stock is endwise insertible to the full depth of said chamber with one end of said strip exposed beyond the open end of said chamber as a flexible gauging portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, one of said walls having a resilient arched terminal lip deformable under pressure resiliently to clamp said strip, and a releasable strip clamp mounted on said casing opposite said arched portion for deforming said lip into frictional clamping engagement with the strip.

4. In a feeler gauge, the combination with a handle member and hand protective casing, of a strip of feeler gauge stock disposed within said casing and adapted to be withdrawn progressively therefrom and cut off at its exposed end when mutilated, said casing comprising a walled enclosure including spaced top and bottom walls defining a strip receiving chamber closed at one end and open at its opposite end and within which the strip of stock is endwise insertible to the full depth of said chamber with one end of said strip exposed beyond the adjacent end of the casing as a flexible gauging portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, one wall of said enclosure having an arched terminal lip deformable under pressure resiliently to engage and hold the strip clamp mounted on said casing for deforming said lip into frictional clamping engagement with the strip.

5. A holder for a strip of feeler gauge stock adapted successively to be cut off at its exposed end when mutilated, comprising a combination handle member and protective casing consisting of a walled enclosure including spaced top and bottom walls defining a stock receiving chamber closed at one end and open at its opposite end and within which the strip of stock is endwise insertible to the full depth of said chamber with one end of said strip exposed beyond the adjacent end of the casing as a flexible gauging portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, one wall of said enclosure having an arched terminal lip deformable under pressure resiliently to engage and hold the stock within said casing, and a releasable clamp on said casing opposite said arched portion of said deformable lip for forcing said wall into clamping engagement with the strip of stock to hold the adjustment thereof.

In testimony whereof I affix my signature.
JAMES E. HASTINGS.